US012057084B2

(12) United States Patent
Ohue et al.

(10) Patent No.: US 12,057,084 B2
(45) Date of Patent: Aug. 6, 2024

(54) DISPLAY DEVICE

(71) Applicant: Japan Display Inc., Tokyo (JP)

(72) Inventors: Yoshihide Ohue, Tokyo (JP); Daijiro Takano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/130,709

(22) Filed: Apr. 4, 2023

(65) Prior Publication Data

US 2023/0326424 A1 Oct. 12, 2023

(30) Foreign Application Priority Data

Apr. 8, 2022 (JP) ................................ 2022-064760

(51) Int. Cl.
*G09G 3/36* (2006.01)

(52) U.S. Cl.
CPC ... *G09G 3/3677* (2013.01); *G09G 2310/0235* (2013.01); *G09G 2310/0286* (2013.01); *G09G 2310/08* (2013.01)

(58) Field of Classification Search
CPC ......... G09G 3/3677; G09G 2310/0235; G09G 2310/0286; G09G 2310/08
See application file for complete search history.

(56) References Cited

U.S. PATENT DOCUMENTS

| | | | | |
|---|---|---|---|---|
| 5,907,314 A * | 5/1999 | Negishi | G09G 3/3677 | 345/87 |
| 2010/0315402 A1* | 12/2010 | Hashimoto | G09G 3/3677 | 345/211 |
| 2017/0249896 A1* | 8/2017 | Kim | H10K 59/1213 | |
| 2018/0190190 A1* | 7/2018 | Xi | G09G 3/3208 | |
| 2018/0197478 A1* | 7/2018 | Wang | G09G 3/3266 | |

FOREIGN PATENT DOCUMENTS

JP 2020160182 A 10/2020

* cited by examiner

*Primary Examiner* — Brent D Castiaux
(74) *Attorney, Agent, or Firm* — K&L Gates LLP

(57) ABSTRACT

A display device includes a plurality of scanning lines extending in a first direction, a plurality of signal lines extending in a direction intersecting the first direction, a first scanning circuit coupled to first coupling end parts of the scanning lines, a second scanning circuit coupled to second coupling end parts of the scanning lines, the second coupling end parts being opposite the first coupling end parts of the scanning lines, the first coupling end parts coupled to the first scanning circuit, and a signal output circuit configured to supply image signals to the signal lines. The scanning lines each have a broken part.

6 Claims, 9 Drawing Sheets

DISPLAY DEVICE

CROSS-REFERENCE TO RELATED APPLICATION

This application claims the benefit of priority from Japanese Patent Application No. 2022-064760 filed on Apr. 8, 2022, the entire contents of which are incorporated herein by reference.

BACKGROUND

1. Technical Field

The present disclosure relates to a display device.

2. Description of the Related Art

A known liquid crystal display device (for example, Japanese Patent Application Laid-open Publication No. 2020-160182 (JP-A-2020-160182)) performs display output in what is called a field sequential color (FSC) scheme in which pixels are controlled so that light in a plurality of colors is transmitted from the same pixel at different timings.

In a typical liquid crystal display device, inversion drive that the direction of voltage applied to a liquid crystal is inverted in each predetermined time is performed. As the potential difference between two electrodes that apply voltage to the liquid crystal increases, the degrees of potential amplitudes of the two electrodes upon inversion increase. Unintended pixel potential leakage enough to cause display output failure may occur depending on the relation between such a degree of potential amplitude and drive potential that opens the gate of a switching element of a pixel. Specifically, due to the potential amplitudes of the two electrodes upon inversion drive, the potential difference between the two electrodes significantly may decrease even at a timing at which no drive potential is provided to the gate of the switching element of the pixel.

The technology of JP-A-2020-160182 prevents display output failure due to the potential amplitudes of the two electrodes upon inversion drive. The potential of a common electrode is switched between relatively high potential and relatively high potential at an inversion drive timing in each predetermined time, and a pixel electrode and the common electrode are set to be equipotential right before the inversion drive timing.

It is needed to prevent the occurrence of signal delay at falling of a drive signal pulse as the number of scanning lines increases. For this, the display device includes a first scanning circuit configured to apply a drive signal pulse to each scanning line to select pixels row by row, a signal output circuit configured to supply an image signal to each pixel on a row selected by the first scanning circuit, and a second scanning circuit coupled to an end part of each scanning line, the end part being opposite a coupling end to which the first scanning circuit is coupled. With such a configuration, when the pixel electrode and the common electrode are set to be equipotential right before the inversion drive timing, the timing of a drive signal pulse from the first scanning circuit and the timing of a drive signal pulse from the second scanning circuit are shifted from each other and short circuit potentially occurs.

The present disclosure is made in view of the above-described problem and intended to provide a display device that prevents signal delay of a drive signal pulse and prevents short circuit between a first scanning circuit and a second scanning circuit.

SUMMARY

A display device according to an embodiment of the present disclosure includes a plurality of scanning lines extending in a first direction, a plurality of signal lines extending in a direction intersecting the first direction, a first scanning circuit coupled to first coupling end parts of the scanning lines, a second scanning circuit coupled to second coupling end parts of the scanning lines, the second coupling end parts being opposite the first coupling end parts of the scanning lines, the first coupling end parts coupled to the first scanning circuit, and a signal output circuit configured to supply image signals to the signal lines. The scanning lines each have a broken part.

DETAILED DESCRIPTION

Figure 1:
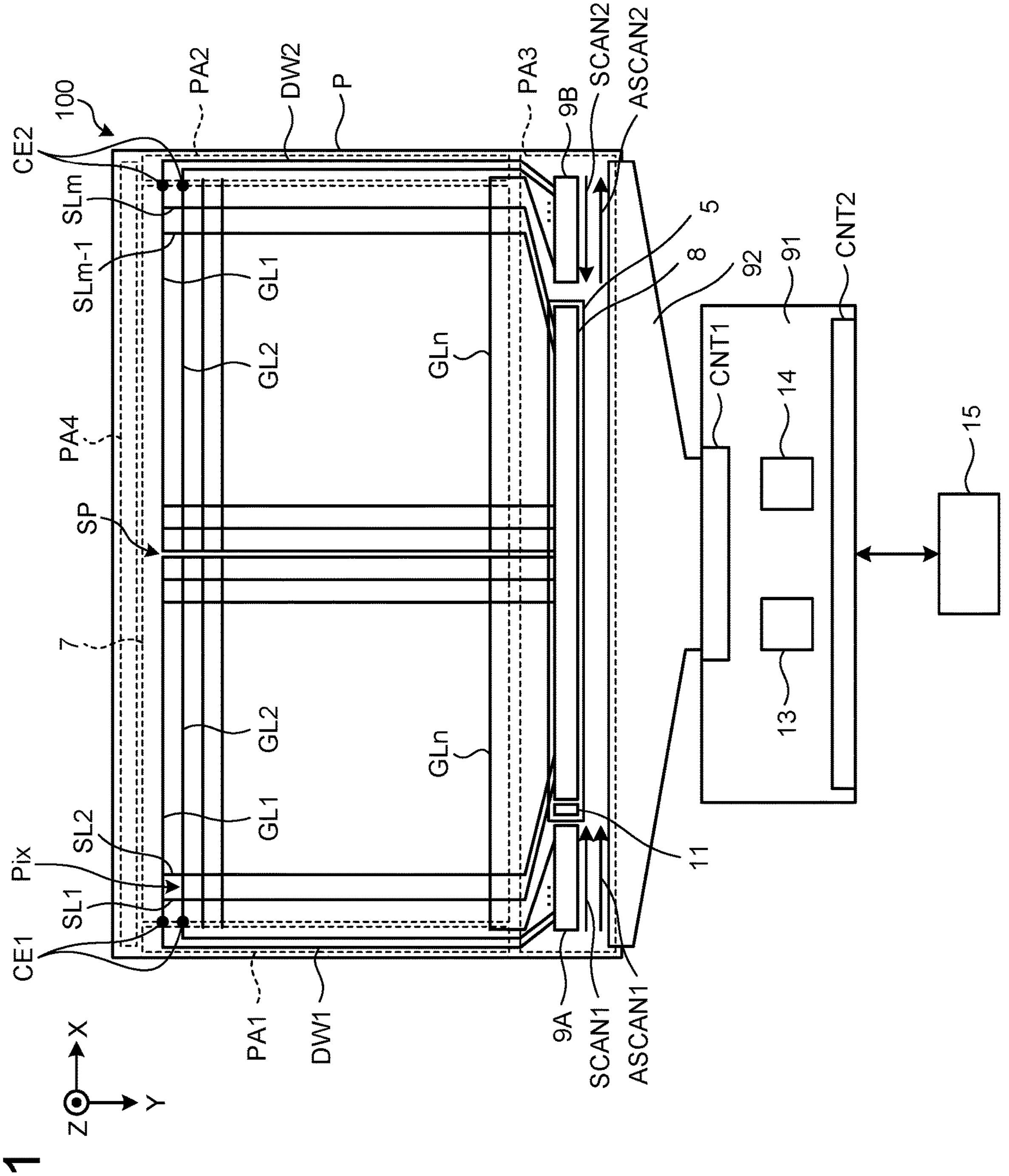
FIG. 1 is a plan view illustrating an exemplary display device of the present embodiment.

An embodiment of the present disclosure will be described below with reference to the accompanying drawings. What is disclosed herein is merely exemplary, and any modification that could be easily thought of by the skilled person in the art as appropriate without departing from the gist of the invention is included in the scope of the present disclosure. In the drawings, the width, thickness, shape, and the like of each component are schematically illustrated for clearer description as compared to actual aspects in some cases, but are merely exemplary and do not limit interpretation of the present disclosure. In the present specification and the drawings, any component same as that already described with reference to an already described drawing is denoted by the same reference sign, and detailed description thereof is omitted as appropriate in some cases.

Figure 2:
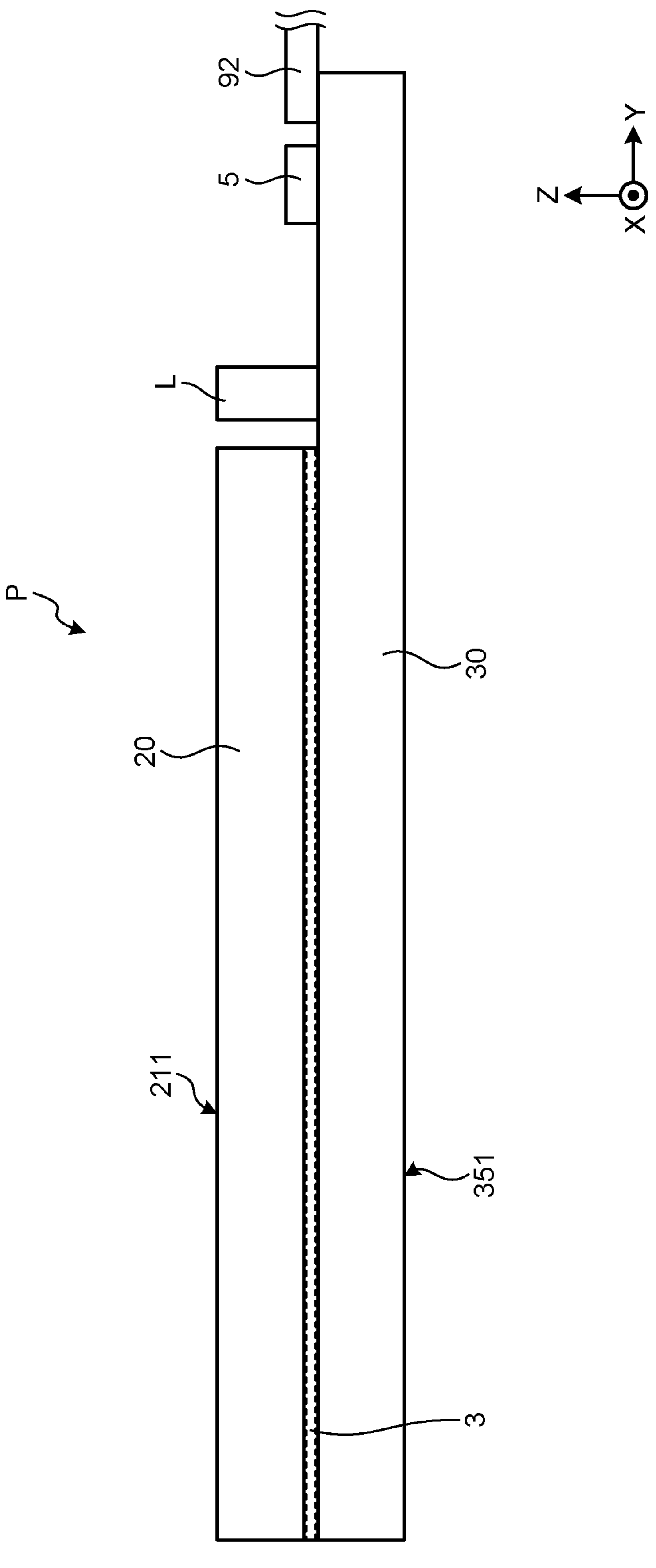
FIG. 2 is a sectional view illustrating an exemplary section of the display device in FIG. 1.
Figure 3:
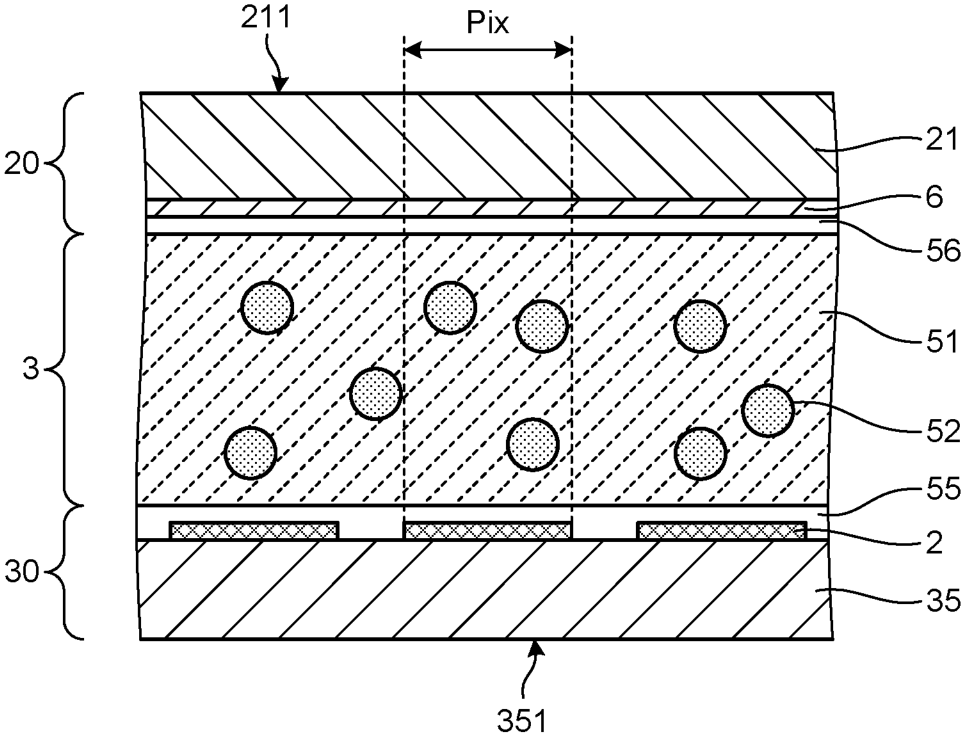
FIG. 3 is an enlarged partial sectional view of part of FIG. 2.
Figure 4:
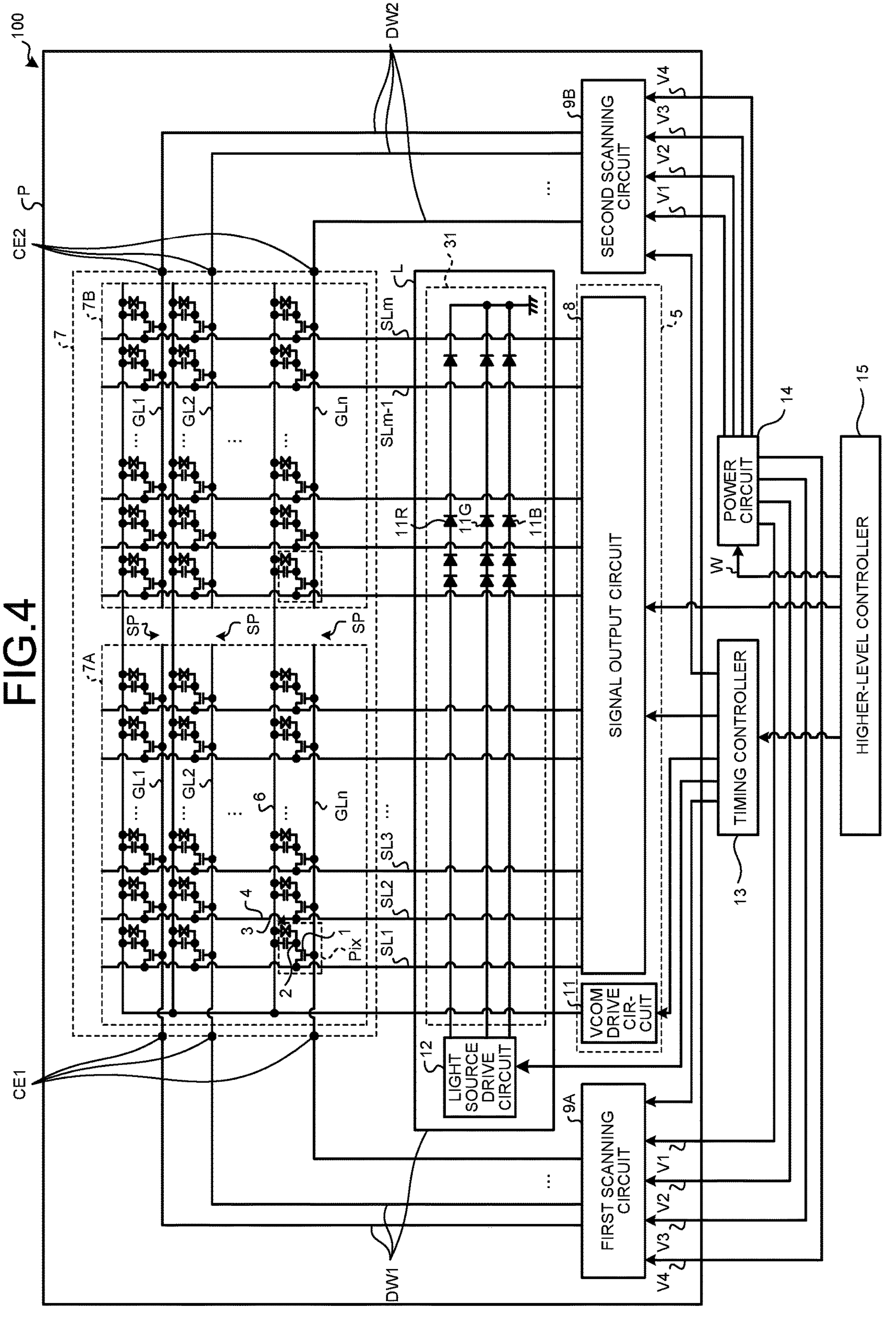
FIG. 4 is a schematic circuit diagram illustrating a main configuration of the display device of the present embodiment.

FIG. 1 is a plan view illustrating an exemplary display device of the present embodiment. A light source device L illustrated in FIG. 2 is omitted in FIG. 1. FIG. 2 is a sectional view illustrating an exemplary section of the display device in FIG. 1. FIG. 3 is an enlarged partial sectional view of part of FIG. 2. FIG. 4 is a schematic circuit diagram illustrating a main configuration of the display device of the present embodiment.

As illustrated in FIG. 1, a display device 100 includes a display panel P, a circuit board 91, and a flexible substrate 92 coupling the display panel P and the circuit board 91. One direction along the plane of the display panel P is defined as a first direction X, a direction orthogonal to the first direction X is defined as a second direction Y, and a direction orthogonal to the X-Y plane is defined as a third direction Z.

The display panel P has a display region 7, a first peripheral region PA1, a second peripheral region PA2, a third peripheral region PA3, and a fourth peripheral region PA4, the peripheral regions being provided around the display region 7. The first peripheral region PA1 and the second peripheral region PA2 sandwich the display region 7 in the first direction X. The third peripheral region PA3 and the fourth peripheral region PA4 sandwich the display region 7 in the second direction Y.

A driver integrated circuit (IC) 5, a first scanning circuit 9A, and a second scanning circuit 9B are disposed in the third peripheral region PA3. The driver IC 5 includes a signal output circuit 8 and a VCOM drive circuit 11.

In the first peripheral region PA1, a plurality of first extension wires DW1 are provided outside first coupling end parts CE1 of scanning lines GL in the first direction X. The first scanning circuit 9A is electrically coupled to the first coupling end parts CE1 through the corresponding first extension wires DW1. In the second peripheral region PA2, a plurality of second extension wires DW2 are provided outside second coupling end parts CE2 of the scanning lines GL in the first direction X. The second scanning circuit 9B is electrically coupled to the second coupling end parts CE2 through the corresponding second extension wires DW2. The first extension wires DW1 are disposed line symmetric to the second extension wires DW2 with respect to a center line passing in the second direction Y through the center of the display region 7 in the first direction X.

A plurality of scanning lines GL1, GL2, . . . , GLn extending in the first direction X and disposed at intervals in the second direction Y are disposed in the display region 7. Hereinafter, the scanning lines GL1, GL2, . . . , GLn are collectively referred to as the scanning lines GL in some cases. A plurality of signal lines SL1, SL2, . . . , SLm−1, SLm extending in the second direction and disposed at intervals in the first direction X are disposed in the display region 7. Hereinafter, the signal lines SL1, SL2, . . . , SLm−1, SLm are collectively referred to as the signal lines SL in some cases.

As illustrated in FIG. 1, each scanning line GL is cut halfway at one broken part SP that is electrically disconnected. The broken parts SP divide the display region 7 into a left region 7A and a right region 7B. The length of each scanning line GL coupled to the first scanning circuit 9A is preferably substantially equal to the length of each scanning line GL coupled to the second scanning circuit 9B. Accordingly, the waveform of a drive signal pulse deforms at similar degrees at the broken part SP through each scanning line GL coupled to the first scanning circuit 9A and through the corresponding scanning line GL coupled to the second scanning circuit 9B, which stabilizes operation of switching elements 1 (refer to FIG. 4).

A plurality of pixels Pix are disposed in a matrix of rows and columns in the display region 7. In the present disclosure, each row is a pixel row including m pixels Pix arrayed in one direction. Each column is a pixel column including n pixels Pix arrayed in a direction orthogonal to a direction in which the rows are arrayed. The values m and n are determined in accordance with a display resolution in the vertical direction and a display resolution in the horizontal direction. The scanning lines GL are wired on the respective rows, and the signal lines SL are wired on the respective columns.

A timing controller 13 and a power circuit 14 are disposed on the circuit board 91.

The display panel P includes a first substrate 30, a second substrate 20, a liquid crystal layer 3, and the light source device L. The second substrate 20 faces the first substrate 30 in a direction (the third direction Z illustrated in FIG. 1) orthogonal to the surface of the first substrate 30. The first substrate 30, the second substrate 20, and a polymer-dispersed liquid crystal LC are encapsulated in the liquid crystal layer 3.

The display panel P of the present embodiment has a configuration in which, for example, when an above-described display surface is a first surface 351 of the first substrate 30, an above-described back surface is a second surface 211 of the second substrate, the background of the back surface is seen through when viewed from the display surface side, and the background of the display surface is seen through when viewed from the back surface side. The display surface may be the second surface 211, and the back surface may be the first surface 351.

As illustrated in FIG. 2, the light source device L is a side light disposed beside side surfaces of the first substrate 30 and the second substrate 20, the side surfaces being orthogonal to the first surface 351. The entrance surface of light is not limited to the side surface of the first substrate 30, but the light source device L may emit light toward the side surface of the second substrate 20 or may emit light toward the side surface of the first substrate 30 and the side surface of the second substrate 20.

As illustrated in FIG. 3, the first substrate 30 includes a translucent glass substrate 35, a pixel electrode 2 formed on the second substrate 20 side of the glass substrate 35, and a first alignment film 55 stacked on the second substrate 20 side to cover the pixel electrodes 2. The pixel electrode 2 is individually provided for each pixel Pix. The second substrate 20 includes a translucent glass substrate 21, a common electrode 6 formed on the first substrate 30 side of the glass substrate 21, and a second alignment film 56 stacked on the first substrate 30 side to cover the common electrode 6. The common electrode 6 has a plate or film shape with which the common electrode 6 is shared by the pixels Pix. Although omitted in FIG. 3, each switching element 1 coupled to the corresponding pixel electrode 2 is formed between the pixel electrode 2 and the glass substrate 35 in the first substrate 30. The first substrate 30 or the second substrate 20 may further include a protection member formed of, for example, glass on the display surface (the first surface 351 or the second surface 211) side of the glass substrate 35 or the glass substrate 21. The protection member may be resin as long as the protection member is translucent.

The liquid crystal layer 3 of the present embodiment is a polymer-dispersed liquid crystal. Specifically, the polymer-dispersed liquid crystal includes a bulk 51 and fine particles 52. Solution containing liquid crystals and monomers is encapsulated between the first substrate 30 and the second substrate 20. The monomers are polymerized by ultraviolet or heat while the monomers and the liquid crystals are oriented by the first alignment film 55 and the second alignment film 56, and accordingly, the bulk 51 is formed. As a result, the liquid crystal layer 3 including the polymer-dispersed liquid crystal in a reverse mode in which the liquid crystals are dispersed in gaps of a polymer network formed in a net shape is formed.

In this manner, the polymer-dispersed liquid crystal includes the bulk 51 formed of polymers and the fine particles 52 dispersed in the bulk 51. The fine particles 52 are formed of the liquid crystals. The bulk 51 and the fine particles 52 are each optically anisotropic.

The orientations of the liquid crystals contained in the fine particles 52 are controlled by voltage difference between the pixel electrodes 2 and the common electrode 6. The orientations of the liquid crystals change with voltage applied to the pixel electrodes 2. The degree of scattering of light passing through the pixels Pix changes as the orientations of the liquid crystals change.

The ordinary light refractive indexes of the bulk 51 and the fine particles 52 are equal to each other. The difference in the refractive index between the bulk 51 and the fine particles 52 is zero in any direction when no voltage is applied between each pixel electrode 2 and the common electrode 6. The liquid crystal layer 3 is in a non-scattering state in which the liquid crystal layer 3 does not scatter light from the light source device L. Light inside the display panel P propagates in a direction departing from the light source device L (a light emitting unit 31) while reflecting at the first surface 351 of the first substrate 30 and the second surface 211 of the second substrate. When the liquid crystal layer 3 is in the non-scattering state in which the liquid crystal layer 3 does not scatter light, the background on the second surface 211 side of the second substrate is visually recognized from the first surface 351 of the first substrate 30 and the background on the first surface 351 side of the first substrate 30 is visually recognized from the second surface 211 of the second substrate.

The optical axis of each fine particle 52 between a pixel electrode 2 to which voltage is applied and the common electrode 6 is tilted by an electric field generated between the pixel electrode 2 and the common electrode 6. The optical axis of the bulk 51 is not changed by the electric field, and thus the orientation of the optical axis of the bulk 51 is different from the orientation of the optical axis of the fine particle 52. Light is scattered at a pixel Pix including a pixel electrode 2 to which voltage is applied. As described above, part of the scattered light, which is externally emitted from the first surface 351 of the first substrate 30 or the second surface 211 of the second substrate is observed by an observer.

At a pixel Pix including a pixel electrode 2 to which no voltage is applied, the background on the second surface 211 side of the second substrate is visually recognized from the first surface 351 of the first substrate 30 and the background on the first surface 351 side of the first substrate 30 is visually recognized from the second surface 211 of the second substrate. In the display device 100 of the present embodiment, voltage is applied to the pixel electrode 2 of a pixel Pix at which an image is displayed, and the image is visually recognized together with the background. In this manner, an image is displayed in the display region 7 when the polymer-dispersed liquid crystal is in a scattering state.

Light is scattered at a pixel Pix including a pixel electrode 2 to which voltage is applied, and an image displayed by externally emitted light is displayed over the background. In other words, the display device 100 of the present embodiment displays an image over the background.

As illustrated in FIG. 4, the light source device L includes a light source drive circuit 12, and the light emitting unit 31 including a plurality of first light sources 11R, a plurality of second light sources 11G, and a plurality of third light sources 11B. FIG. 4 representatively illustrates some of the first light sources 11R, the second light sources 11G, and the third light sources 11B. As illustrated in FIG. 4, the light source drive circuit 12 is attached to the light source device L. The light source drive circuit 12 may be built in the driver IC, separately from the light source device L.

Each first light source 11R emits light in red. Each second light source 11G emits light in green. Each third light source 11B emits light in blue. The first light sources 11R, the second light sources 11G, and the third light sources 11B each emit light under control of the light source drive circuit 12. The first light sources 11R, the second light sources 11G, and the third light sources 11B of the present embodiment are each, for example, a light source using a light emitting element such as a light emitting diode (LED), but the present disclosure is not limited thereto and each light source may be any light source, the light emission timing of which is controllable. The light source drive circuit 12 controls the light emission timings of the first light sources 11R, the second light sources 11G, and the third light sources 11B under control of the timing controller 13.

As illustrated in FIG. 4, an input signal (such as an RGB signal) is input to the timing controller 13 from an image output unit of an external higher-level controller 15 through the flexible substrate or the like.

The pixels Pix are disposed in a matrix of rows and columns in the display region 7 and arranged in the row direction and the column direction. The pixels Pix include the respective switching elements 1.

As illustrated in FIG. 4, each switching element 1 is a switching element using a semiconductor, such as a thin film transistor (TFT). One of the source and drain of the switching element 1 is coupled to one (the pixel electrode 2) of two electrodes. The other of the source and drain of the switching element 1 is coupled to the corresponding signal line SL. The gate of the switching element 1 is coupled to a scanning line GL. Under control of the first scanning circuit 9A and the second scanning circuit 9B, the scanning line GL provides potential (drive potential) for opening and closing the source-drain of the switching element 1. The drive potential control is performed by the first scanning circuit 9A and the second scanning circuit 9B.

As illustrated in FIG. 4, the signal lines SL are arranged in one (row direction) of directions in which the pixels Pix are arranged. The signal lines SL extend in the other (column direction) of directions in which the pixels Pix are arranged. Each signal line SL is shared by the switching elements 1 of a plurality of pixels Pix arranged in the column direction. The scanning lines GL are arranged in the column direction. The scanning lines GL extend in the row direction. Each scanning line GL is shared by the switching elements 1 of a plurality of pixels Pix arranged in the row direction.

The common electrode 6 is coupled to the VCOM drive circuit 11. The VCOM drive circuit 11 provides reference potential to the common electrode 6. When the signal output circuit 8 outputs a pixel signal to a signal line SL at a timing at which the first scanning circuit 9A and the second scanning circuit 9B provide potential (first potential) to the scanning lines GL all at once, a storage capacitor formed between each pixel electrode 2 and the common electrode 6 and the liquid crystal (fine particles 52) as a capacitive load are charged. Accordingly, each pixel Pix obtains voltage corresponding to the pixel signal. After application of the first potential is completed, the storage capacitor and the liquid crystal (fine particles 52) as the capacitive load hold the pixel signal. The orientation of each liquid crystal (fine particles 52) is controlled in accordance with an electric field generated by the voltage of each pixel Pix and the voltage of the common electrode 6.

The timing controller 13 controls the operation timings of the signal output circuit 8, the first scanning circuit 9A, the second scanning circuit 9B, the VCOM drive circuit 11, and the light source drive circuit 12. In the present embodiment, the operation control is performed by an FSC scheme.

Figure 5:
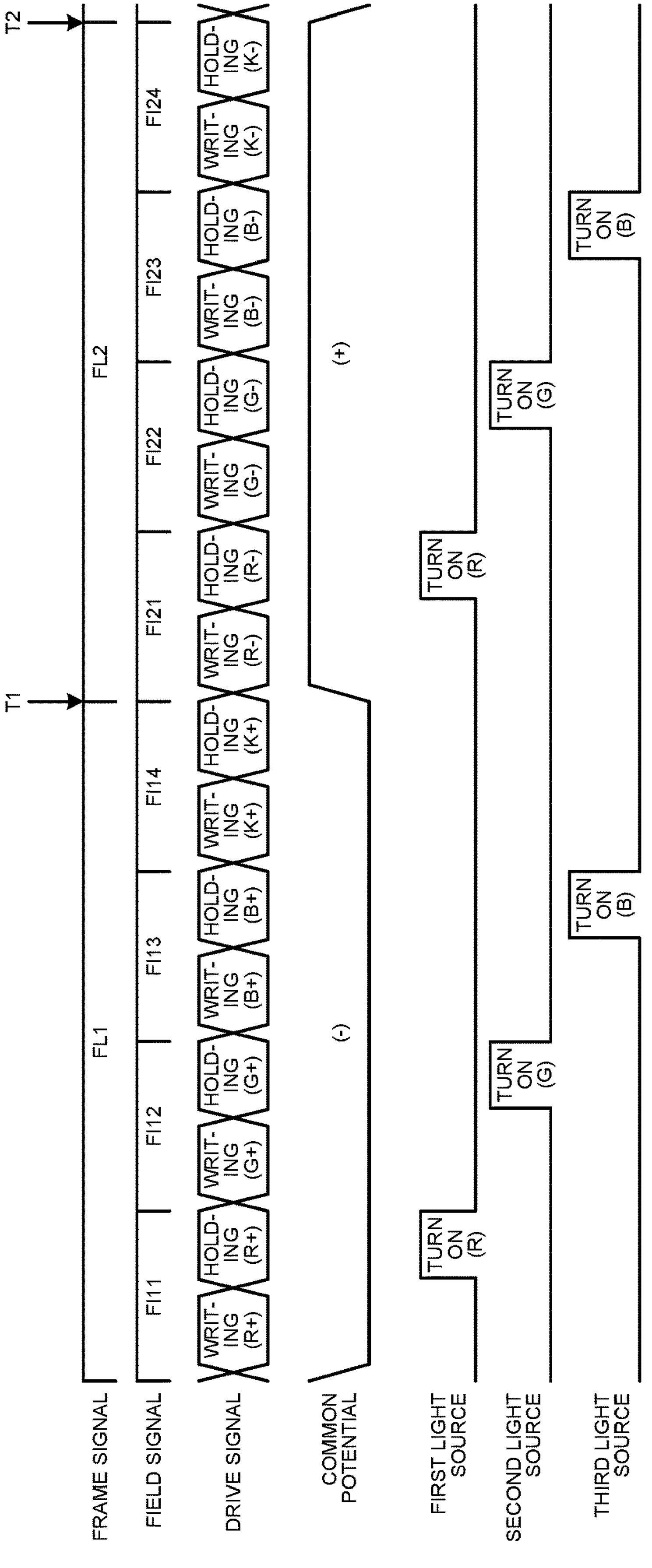
FIG. 5 is a timing chart illustrating an exemplary process of FSC control of the present embodiment.

FIG. 5 is a timing chart illustrating an exemplary process of the operation control by the FSC scheme in the present embodiment. FIG. 5 illustrates a schematic timing chart of two frame durations. The timing chart in FIG. 5 includes information indicating outputting of a frame signal, outputting of a field signal, switching of a drive signal, switching of common potential, and the turn-on timings of the first light source 11R, the second light source 11G, and the third light source 11B. The switching of the drive signal indicates the switching of the potential of the scanning lines GL. The switching of the common potential indicates the switching of the potential of the common electrode 6.

The frame signal is a signal indicating the start timing of each frame duration. FIG. 5 illustrates that the frame signal is output at start of a duration FL1 of the first frame, start of a duration FL2 of the second frame, and start of the duration of the next frame (third frame) following end of the second frame. A time (frame time) in which one frame image is displayed is a predetermined time like the duration FL1 of the first frame and the FL2 of the second frame. In other words, the frame image is updated at each elapse of the predetermined time. In the third frame and later, a duration in which control is performed in the same manner as in the duration FL1 of the first frame and a duration in which control is performed in the same manner as in the duration FL2 of the second frame alternately occur.

The field signal is a signal indicating the start timing of a field duration included in each frame duration. One frame duration includes field durations in a number corresponding to the number of colors of light emitted by the light source device L. In FIG. 5, the duration FL1 of the first frame includes a first field duration FI11, a second field duration FI12, a third field duration FI13, and a fourth field duration FI14. The duration FL2 of the second frame includes a first field duration FI21, a second field duration FI22, a third field duration FI23, and a fourth field duration FI24. Display control of continuous frame images is performed as the duration FL1 and the duration FL2 are repeated.

Each field duration includes a writing duration of the pixel signal and a holding duration of the pixel signal by the storage capacitor. In FIG. 5, writing (R+) represents the writing duration of the first field duration FI11. Holding (R+) represents the holding duration of the first field duration FI11. Writing (G+) represents the writing duration of the second field duration FI12. Holding (G+) represents the holding duration of the second field duration FI12. Writing (B+) represents the writing duration of the third field duration FI13. Holding (B+) represents the holding duration of the third field duration FI13. Writing (K+) represents the writing duration of the fourth field duration FI14. Holding (K+) represents the holding duration of the fourth field duration FI14. Writing (R−) represents the writing duration of the first field duration FI21. Holding (R−) represents the holding duration of the first field duration FI21. Writing (G−) represents the writing duration of the second field duration FI22. Holding (G−) represents the holding duration of the second field duration FI22. Writing (B−) represents the writing duration of the third field duration FI23. Holding (B−) represents the holding duration of the third field duration FI23. Writing (K−) represents the writing duration of the fourth field duration FI24. Holding (K−) represents the holding duration of the fourth field duration FI24.

Among a plurality of field durations in the duration of one frame, the writing durations included in field durations except for the fourth field durations FI14 and FI24 are durations in which pixel signals corresponding to the gradation values of different colors are written. For example, the pixel signals of the first frame are (R, G, B)=(r1, g1, b1) when expressed in RGB gradation values. In this case, the pixel signal corresponding to the gradation value of "r1" is written in the writing duration of the first field duration FI11. The pixel signal corresponding to the gradation value of "g1" is written in the writing duration of the second field duration FI12. The pixel signal corresponding to the gradation value of "b1" is written in the writing duration of the third field duration FI13. The holding durations included in a plurality of field durations in the duration of one frame are durations in which pixel signals corresponding to the gradation values of different colors are held.

Light sources (for example, the first light source 11R, the second light source 11G, and the third light source 11B) of a plurality of colors included in the light source device L are each controlled to turn on in the holding duration of the corresponding field duration. For example, the first light source 11R is a red light source, the second light source 11G is a green light source, and the third light source 11B is a blue light source. In the duration FL1 of the first frame, the first light source 11R turns on in the holding duration of the first field duration F11. Accordingly, scattering light in red in accordance with voltage corresponding to the gradation value (r1) of red (R) written in the writing duration of the first field duration F11 is emitted. In the duration FL1 of the first frame, the second light source 11G turns on in the second field duration F12. Accordingly, scattering light in green in accordance with voltage corresponding to the gradation value (g1) of green (G) written in the writing duration of the second field duration F12 is emitted. In the duration FL1 of the first frame, the third light source 11B turns on in the third field duration F13. Accordingly, scattering light in blue in accordance with voltage corresponding to the gradation value (b1) of blue (B) written in the writing duration of the third field duration F13 is emitted. In this manner, writing and holding of the pixel signals of R, G, and B and illumination with light from the light sources of the corresponding colors are included in one frame duration, and accordingly, color generation corresponding to RGB image data is performed in the one frame duration. Color generation is performed in the same manner in the duration FL2 of the second frame and later as well.

The frequency of field durations is obtained by multiplying the frequency of frame durations by "the number of colors of light emitted by the light source device L+1". In the present embodiment, the frequency of frame durations is, for example, 60 Hz, but the present disclosure is not limited thereto and the frequency of frame durations may be 120 Hz or any other frequency. The frequency of field durations of the present embodiment is 240 Hz when the frequency of frame durations is 60 Hz, but the frequency of field durations is changeable as appropriate in accordance with the frequency of frame durations and the number of colors of light emitted by the light source device L.

In FIG. 5, each writing duration and each holding duration are illustrated as apparently equivalent durations, but do not necessarily need to be equal to each other. For example, the holding duration may be longer or shorter than the writing duration.

The display panel P performs inversion drive in which relatively high potential and relatively low potential of the common electrode 6 are switched at an inversion drive timing in each predetermined time. In FIG. 5, the VCOM drive circuit 11 controls the potential of the common electrode 6 so that the common potential is zero (0) or negative (−) in the duration FL1 of the first frame and the common potential is positive (+) in the duration FL2 of the second frame. Accordingly, a pixel signal in which the potential of the pixel electrode 2 is relatively high potential (+) corresponding to the zero (0) or negative (−) common potential is written in the duration FL1 of the first frame, and a pixel signal in which the potential of the pixel electrode 2 is relatively low potential (−) corresponding to the positive (+) common potential is written in the duration FL2 of the second frame. Each sign in a pair of parentheses in the illustration of the drive signal in FIG. 5 indicates a combination of color of an RGB gradation value and potential, corresponding to a pixel signal to be written.

Although the common potential is inverted so as to switch between positive (+) and negative (−) in the example illustrated in FIG. 5, the negative (−) common potential may be replaced with zero (0) as in FIGS. 6 and 7 to be described later.

In the present embodiment, control of the potential of the pixel electrode 2 for inversion drive is performed at each pixel Pix. Specifically, the signal output circuit 8 outputs a pixel signal for inversion drive to a signal line SL. Specifically, the signal output circuit 8 outputs the pixel signal in accordance with the timing of inversion drive of the common electrode 6 so that voltage has the same amplitude but different polarities between the pixel electrode 2 and the common electrode 6. In addition, the VCOM drive circuit 11 performs switching of the potential of the common electrode 6 for inversion drive. Then, the timing controller 13 synchronizes, in the frame duration period, the timing of potential switching of the pixel electrode 2 by an inversion drive circuit and the timing of potential switching of the common electrode 6 by the VCOM drive circuit 11. These function as an inversion drive unit of the present embodiment. The relatively high potential (+) of the pixel electrode 2 is not limited to positive potential but is controlled to be equal to or higher than the negative (−) common potential. The relatively low potential (−) of the pixel electrode 2 is not limited to negative potential but is controlled to be equal to or lower than the positive (+) common potential.

An image signal (RGB data) on which a pixel signal is based is input to the display panel P through the higher-level controller 15 included in, for example, an external image output device. The higher-level controller 15 outputs signals indicating the gradation values of red (R), green (G), and blue (B) colors at each pixel Pix to the signal output circuit 8 based on the image signal. The higher-level controller 15 also outputs a synchronizing signal synchronized with the timing of signal inputting to the signal output circuit 8 and any other control signal to the timing controller 13. The timing controller 13 controls operation of the signal output circuit 8, the first scanning circuit 9A, the second scanning circuit 9B, the VCOM drive circuit 11, and the like based on the signals input from the higher-level controller 15. The higher-level controller 15 may be provided at the display panel P. Alternatively, the higher-level controller 15 may be provided as a function of a display driver integrated circuit (DDIC) designed to integrate another circuit such as the timing controller 13.

Figure 6:
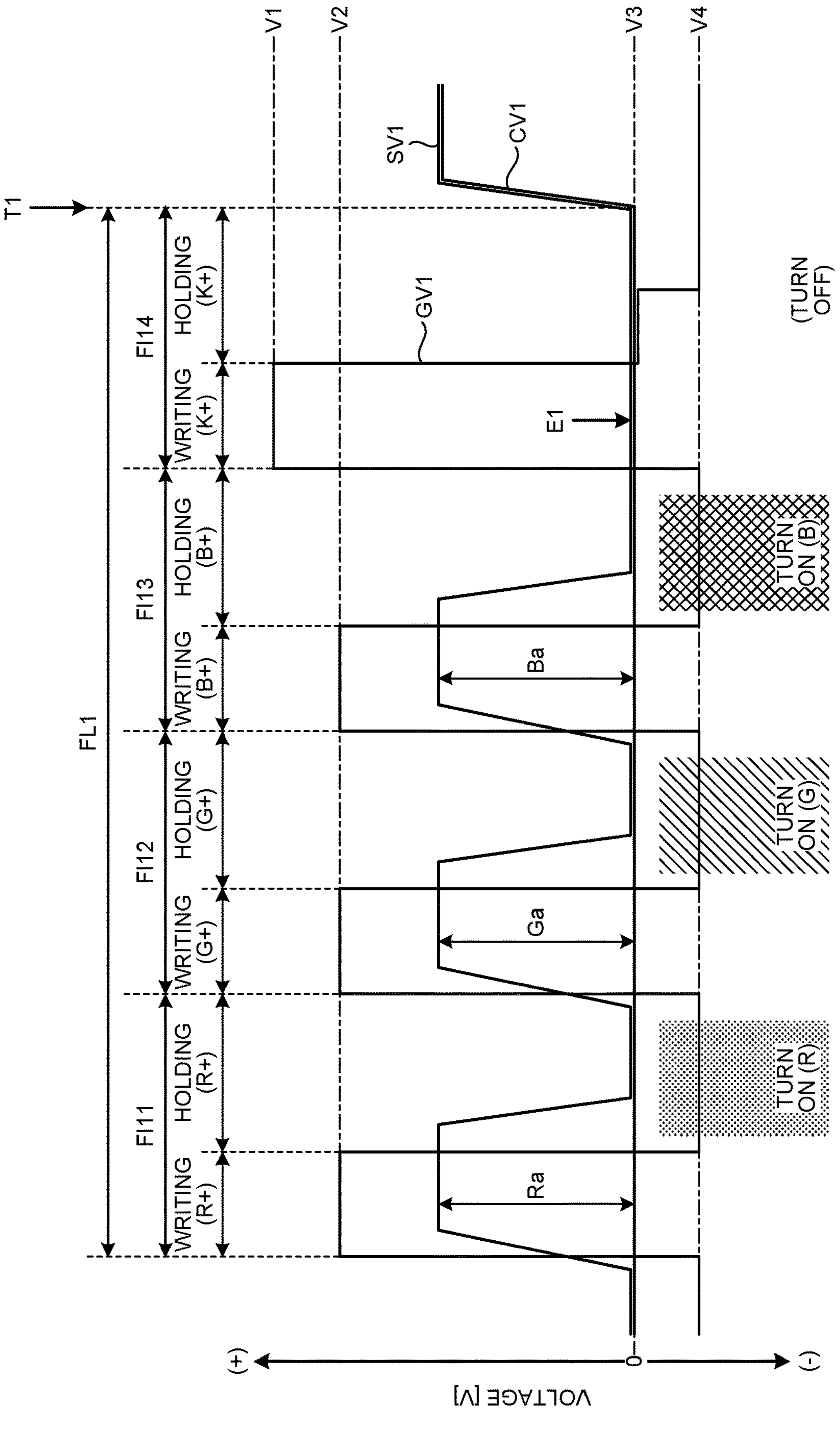
FIG. 6 is a timing chart illustrating exemplary control of pixel signal potential, common potential, and drive potential in the duration of the first frame.

FIG. 6 is a timing chart illustrating exemplary control of pixel signal potential SV1, common potential CV1, and drive potential GV1 in the duration FL1 of the first frame. The pixel signal potential SV1 and pixel signal potential SV2 (refer to FIG. 7) are provided from the signal line SL to the pixel electrode 2 through the switching element 1 under control of the signal output circuit 8. The common potential CV1 and the common potential CV2 (refer to FIG. 7) are provided to the pixel electrode 2 under control of the VCOM drive circuit 11. The drive potential GV1 and drive potential GV2 (refer to FIG. 7) are provided to the scanning line GL under control of the first scanning circuit 9A and the second scanning circuit 9B.

As illustrated in FIG. 6, the drive potential GV1 becomes second potential V2 in the writing duration included in each of the first field duration FI11, the second field duration FI12, and the third field duration FI13. The second potential V2 opens the source-drain of the switching element 1. A pixel signal is provided to the pixel Pix in accordance with the timing at which the drive potential GV1 becomes the second potential V2.

Specifically, for example, the pixel signal potential SV1 is controlled so that voltage equal to or higher than 0 [V] is provided to the signal line SL to generate a potential difference Ra from the common potential CV1 of 0 [V] in the writing duration (writing (R+)) included in the first field duration FI11. The potential difference Ra corresponds to the potential difference between the pixel electrode 2 and the common electrode 6 for controlling translucency of light from the first light source 11R, which are turned on in the holding duration (holding (R+)) included in the first field duration FI11. In other words, a pixel signal provided in the writing duration (writing (R+)) included in the first field duration FI11 generates the potential difference Ra.

Similarly, the pixel signal potential SV1 is controlled to generate a potential difference Ga from the common potential CV1 of 0 [V] in the writing duration (writing (G+)) included in the second field duration FI12. The pixel signal potential SV1 is also controlled to generate a potential difference Ba from the common potential CV1 of 0 [V] in the writing duration (writing (B+)) included in the third field duration FI13.

The drive potential GV1 becomes fourth potential V4 in the holding duration included in each of the first field duration FI11, the second field duration FI12, and the third field duration FI13. The fourth potential V4 closes the source-drain of the switching element 1. The first light source 11R, the second light source 11G, and the third light source 11B are turned on in accordance with the timing at which the drive potential GV1 becomes the fourth potential V4. In this manner, the duration in which the light source device L, which illuminates the display panel P, is turned on is a duration in which the potential of the pixel electrode 2 is held and that is set after the writing duration in which the source-drain is opened by the second potential V2. The writing duration is the writing duration included in each field duration. The potential holding duration is the holding duration included in each field duration.

As illustrated in FIG. 6, the drive potential GV1 becomes first potential V1 in the writing duration (writing (K+)) included in the fourth field duration FI14. The pixel signal potential SV1 is controlled so that the pixel electrode 2 and the common electrode 6 become equipotential in accordance with the timing at which the drive potential GV1 becomes the first potential V1. Specifically, the pixel signal potential SV1 is controlled to become equipotential with the common potential CV1 (for example, 0 [V]) in the duration FL1 of the first frame in the writing duration (writing (K+)) included in the fourth field duration FI14. Accordingly, the translucency of a pixel Pix included in the normally white display panel P as in the embodiment becomes high and it becomes extremely difficult for a user to recognize reflected light from the pixel Pix. Thus, display at the pixel Pix is not visually recognized in the holding duration (holding (K+)) included in the fourth field duration FI14, for example, when there is no light from the side surface side or back surface side of the display panel P. The light source device L is turned off in the holding duration (holding (K+)) included in the fourth field duration FI14.

In this manner, the pixel signal potential SV1 is controlled so that the pixel electrode 2 and the common electrode 6 become equipotential before an inversion drive timing T1. Thus, it is possible to prevent the occurrence of a phenomenon in which it becomes difficult to maintain the potential difference between the pixel electrode 2 and the common electrode 6 and display output fails when the common potential CV1 changes at the inversion drive timing T1 and accordingly, the pixel signal potential SV1 changes. In other words, it is easy to perform potential control to invert potential between the pixel electrode 2 and the common electrode 6 while maintaining the potential difference between the pixel electrode 2 and the common electrode 6 having different potential.

The first potential V1 provided to the scanning line GL in the writing duration (writing (K+)) included in the fourth field duration FI14 in which a pixel signal E1 for setting the pixel electrode 2 and the common electrode 6 to be equipotential is provided to the signal line SL is higher than potential in any other duration (for example, the second potential V2 in the writing duration included in each of the first field duration FI11, the second field duration FI12, and the third field duration FI13). Accordingly, the response speed of the switching element 1 increases in the writing duration (writing (K+)) included in the fourth field duration FI14. As a result, the pixel electrode 2 of the pixel Pix and the common electrode 6 become equipotential faster after the holding duration (holding (B+)) included in the third field duration FI13. Thus, a potential control duration (for example, the fourth field duration FI14) for preventing display output failure is further shortened.

As illustrated in FIG. 6, the drive potential GV1 first becomes third potential V3 and then becomes the fourth potential V4 in the holding duration (holding (K+)) included in the fourth field duration FI14. The third potential V3 closes the source-drain of the switching element 1 and is higher than the fourth potential V4. This is because, to further increase the response speed of the switching element 1 of the pixel Pix, it is easier and more reliable in terms of potential control to decrease the drive potential GV1, which is set to the first potential V1 in the writing duration (writing (K+)) included in the fourth field duration FI14, from the first potential V1 to the third potential V3 than from the first potential V1 to the fourth potential V4. With setting to the third potential V3, the source-drain of the switching element 1 is closed, and thereafter, the scanning line GL becomes the fourth potential V4. As a result, it becomes easy to control opening and closing of the source-drain of the switching element 1 in switching between the second potential V2 and the fourth potential V4 (refer to FIG. 7) in the duration FL2 of the second frame, which is performed after the inversion drive timing T1.

The first potential V1, the second potential V2, the third potential V3, and the fourth potential V4 are generated by, for example, the power circuit 14 (refer to FIG. 4). The power circuit 14 is supplied with electric power W from the outside and supplies potential corresponding to each of the first potential V1, the second potential V2, the third potential V3, and the fourth potential V4 to the first scanning circuit 9A and the second scanning circuit 9B. The power circuit 14 may generate potential suitable for operation of each component included in the display device 100 and supply electric power to the component. The first scanning circuit 9A and the second scanning circuit 9B may have a function to receive electric power supply from the outside and generate the first potential V1, the second potential V2, the third potential V3, and the fourth potential V4.

The first potential V1 is, for example, 55 [V]. The second potential V2 is, for example, 45 [V]. The third potential V3 is, for example, 0 [V]. The fourth potential V4 is, for example, −10 [V]. These potentials are merely exemplary and the present disclosure is not limited thereto, but it is only needed that V1>V2>V3>V4 is satisfied, the source-drain of the switching element 1 is opened in accordance with the first potential V1 and the second potential V2, and the source-drain of the switching element 1 is closed in accordance with the third potential V3 and the fourth potential V4.

The VCOM drive circuit 11 outputs a VCOM drive signal 301 so that the potential of the common electrode 6 is switched in accordance with the inversion drive timing T1 and an inversion drive timing T2. In the examples illustrated in FIGS. 5 and 6, the potential of the common electrode 6 is switched from negative (−) to positive (+) at the inversion drive timing T1. In addition, the potential of the common electrode 6 is switched from positive (+) to negative (−) at the inversion drive timing T2.

To facilitate distinction between the potential (pixel signal potential SV1) of the pixel signal E1 and the common potential CV1 in the writing duration (writing (K+)) included in the fourth field duration FI14, both the pixel signal potential SV1 and the common potential CV1 are illustrated in FIG. 6 but are equipotential or substantially equipotential in reality. This is the same for the relation between the potential (pixel signal potential SV2) of a pixel signal E2 illustrated in FIG. 7 to be described later and the common potential CV2.

Figure 7:
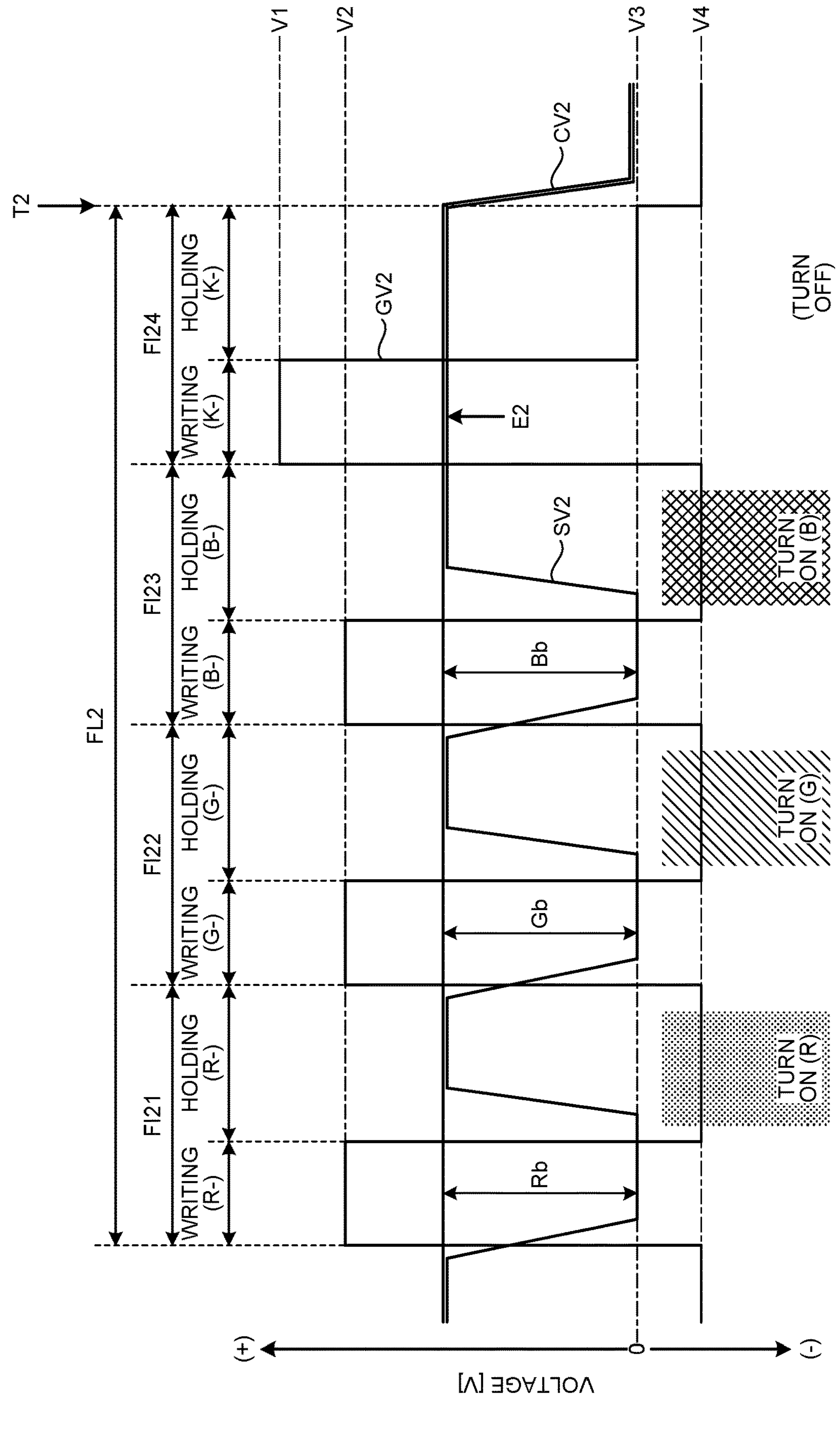
FIG. 7 is a timing chart illustrating exemplary control of the pixel signal potential, the common potential, and the drive potential in the duration of the second frame.

FIG. 7 is a timing chart illustrating exemplary control of the pixel signal potential SV2, the common potential CV2, and the drive potential GV2 in the duration FL2 of the second frame. As illustrated in FIG. 7, the drive potential GV2 becomes the second potential V2 in the writing duration included in each of the first field duration FI21, the second field duration FI22, and the third field duration FI23. A pixel signal is provided to the pixel Pix in accordance with the timing at which the drive potential GV1 becomes the second potential V2. The drive potential GV2 becomes the fourth potential V4 in the holding duration included in each of the first field duration FI21, the second field duration FI22, and the third field duration FI23. The first light source 11R, the second light source 11G, and the third light source 11B are turned on in accordance with the timing at which the drive potential GV2 becomes the fourth potential V4.

Specifically, for example, the pixel signal potential SV2 is controlled so that potential equal to or lower than the common potential CV2 in the writing duration (writing (R−)) included in the first field duration FI21 is provided to the signal line SL to generate a potential difference Rb from the common potential CV2, which is higher than the third potential V3 and lower than the second potential V2. Similarly, the pixel signal potential SV2 is controlled to generate a potential difference Gb from the common potential CV2 in the writing duration (writing (G−)) included in the second field duration FI22 and generate a potential difference Bb therefrom in the writing duration (writing (B−)) included in the third field duration FI23.

As illustrated in FIG. 7, the drive potential GV2 becomes the first potential V1 in the writing duration (writing (K−)) included in the fourth field duration FI24. The pixel signal potential SV2 is controlled so that the pixel electrode 2 and the common electrode 6 become equipotential in accordance with the timing at which the drive potential GV1 becomes the first potential V1. Specifically, the pixel signal potential SV2 is controlled to become equipotential with the common potential CV2 in the duration FL1 of the first frame in the writing duration (writing (K−)) included in the fourth field duration FI24. In this manner, the pixel signal potential SV2 is controlled so that the pixel electrode 2 and the common electrode 6 become equipotential before the inversion drive timing T2. Thus, it is possible to prevent the occurrence of a phenomenon in which it becomes difficult to maintain the potential difference between the pixel electrode 2 and the common electrode 6 and display output fails when the common potential CV2 changes at the inversion drive timing T2 and accordingly, the pixel signal potential SV2 changes. In other words, it is easy to perform potential control to invert potential between the pixel electrode 2 and the common electrode 6 while maintaining the potential difference between the pixel electrode 2 and the common electrode 6 having different potential.

The first potential V1 provided to the scanning line GL in the writing duration (writing (K−)) included in the fourth field duration FI24 in which the pixel signal E2 for setting the pixel electrode 2 and the common electrode 6 to be equipotential is provided to the signal line SL is higher than potential in any other duration (for example, the second potential V2 in the writing duration included in each of the first field duration FI21, the second field duration FI22, and the third field duration FI23). Accordingly, the response speed of the switching element 1 increases in the writing duration (writing (K−)) included in the fourth field duration FI24. As a result, the pixel electrode 2 of the pixel Pix and the common electrode 6 become equipotential faster after the holding duration (holding (B−)) included in the third field duration FI23. Thus, a potential control duration (for example, the fourth field duration FI24) for preventing display output failure is further shortened.

The light source device L is turned off in the holding duration (holding (K−)) included in the fourth field duration FI24 as in the holding duration (holding (K+)) included in the fourth field duration FI14. As illustrated in FIG. 7, the drive potential GV2 becomes the third potential V3 in the holding duration (holding (K−)) included in the fourth field duration FI24. The drive potential GV2 becomes the fourth potential V4 at the inversion drive timing T2. In this manner, the timing of switching from the third potential V3 to the fourth potential V4 may be the same as the inversion drive timing. In the case of the fourth field duration FI24, in particular, it is possible to ensure a sufficient potential difference between the drive potential GV2 and each of the common potential CV2 and the pixel signal potential SV before inversion drive even though the drive potential GV2 is the third potential V3 in the holding duration (holding (K−)).

In the embodiment, the timing of pixel signal provision, in other words, the timing of driving the switching element 1 by the drive signal from the first scanning circuit 9A and the second scanning circuit 9B is the same among a plurality of pixels Pix sharing the scanning line GL. In other words, the timing of driving the switching element 1 by the drive signal from the first scanning circuit 9A and the second scanning circuit 9B can be individually set for each of pixels Pix not sharing the scanning line GL but provided at different positions in the column direction. In the embodiment, the first scanning circuit 9A and the second scanning circuit 9B provide the drive signal at a different timing for each scanning line GL, but the present disclosure is not limited thereto and the drive signal may be simultaneously provided to a predetermined number of scanning lines GL.

In the embodiment, the timing at which the potential of the pixel electrode 2 and the potential of the common electrode 6 are switched by inversion drive is the same irrespective of the position of the corresponding pixel Pix. Moreover, in the present embodiment, change of the drive potential GV1 in the fourth field duration FI14 and change of the drive potential GV2 in the fourth field duration FI24 are performed at a timing same among all scanning lines GL.

According to the present embodiment, the two electrodes (the pixel electrode 2 and the common electrode 6) become equipotential right before the inversion drive timing T1 and the inversion drive timing T2. Thus, it is possible to prevent the occurrence of display output failure due to a difficulty in maintaining the potential difference between the pixel electrode 2 and the common electrode 6 along with inversion drive.

The first potential V1 provided to the scanning line GL in the duration in which a signal (the pixel signal E1 or E2) for setting the pixel electrode 2 and the common electrode 6 to be equipotential is provided to the signal line SL is higher than potential in any other duration (for example, the second potential V2, the third potential V3, or the fourth potential V4). Thus, a potential control duration (for example, the fourth field duration FI14 or the fourth field duration FI24) for preventing display output failure is further shortened.

Figure 8:
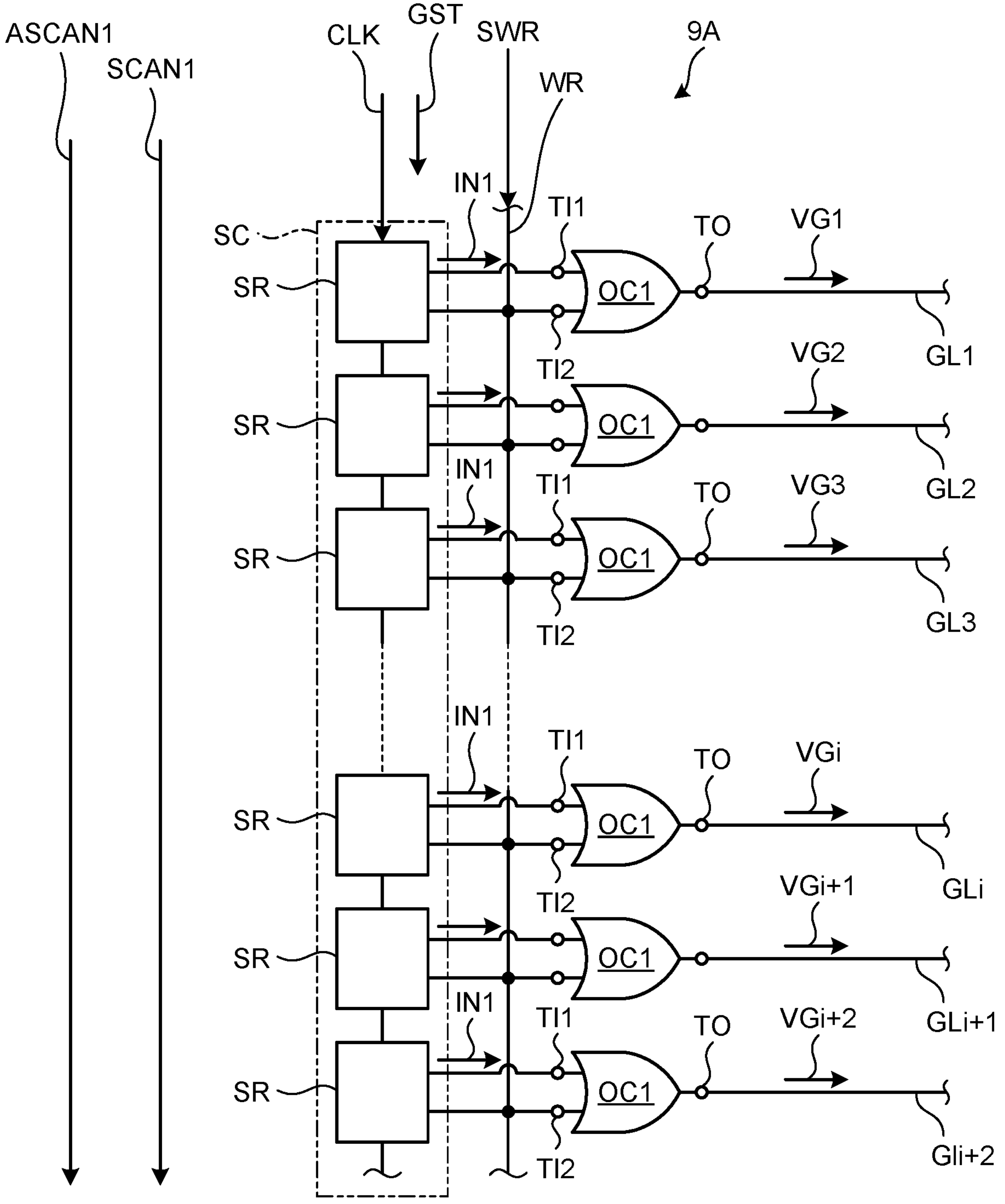
FIG. 8 is a circuit diagram illustrating part of a first scanning circuit.
Figure 9:
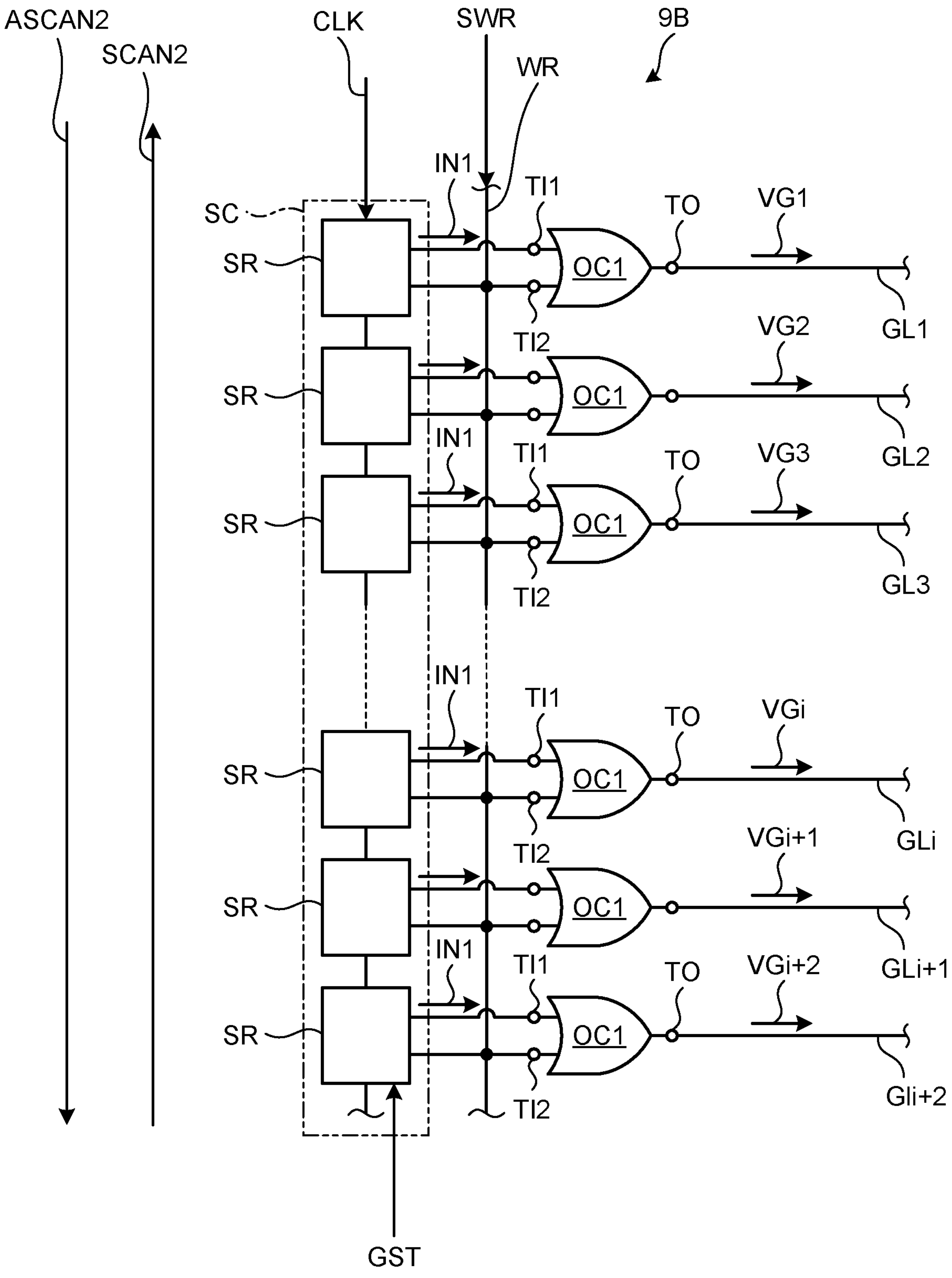
FIG. 9 is a circuit diagram illustrating part of a second scanning circuit.

FIG. 8 is a circuit diagram illustrating part of the first scanning circuit. FIG. 9 is a circuit diagram illustrating part of the second scanning circuit. As illustrated in FIGS. 8 and 9, the first scanning circuit 9A and the second scanning circuit 9B each include a sequential circuit SC, a control wire WR, and a plurality of logic circuits OC. Each logic circuit OC is an OR circuit. The sequential circuit SC includes a plurality of shift registers SR. The shift registers SR are coupled in series. The first scanning circuit 9A and the second scanning circuit 9B have the same configuration.

The logic circuits OC are coupled to the shift registers SR in one-to-one relation. Each logic circuit OC includes a first input terminal TI1, a second input terminal TI2, and an output terminal TO. The first input terminal TI1 is coupled to the corresponding shift register SR. The second input terminal TI2 is coupled to the control wire WR. The output terminal TO is coupled to one corresponding scanning line G.

Each logic circuit OC outputs a high-level gate signal VG from the output terminal TO to the scanning line GL when a high-level first input signal IN1 is provided from the corresponding shift register SR to the first input terminal TI1. The logic circuit OC outputs a low-level gate signal VG from the output terminal TO to the scanning line G when simultaneously provided with a low-level first input signal IN1 and a low-level input signal SWR.

Each logic circuit OC1 is coupled to one corresponding scanning line GL among a plurality of scanning lines GL1, GL2, GL3, . . . , GLi, GLi+1, GLi+2, . . . , GLn (refer to FIG.

The sequential circuit SC provides the high-level first input signal IN1 to the first input terminals TI1 of all logic circuits OC1 in the order of operation of the shift register SR. The timing controller 13 provides a start pulse signal GST and a gate clock signal GLK having a predetermined frequency to the first scanning circuit 9A and the second scanning circuit 9B. The first scanning circuit 9A and the second scanning circuit 9B scan the scanning lines GL in synchronization with the gate clock signal GLK.

The following describes operation of the first scanning circuit 9A and the second scanning circuit 9B in the writing duration of the first field durations FI11 and FI21, the writing duration of the second field durations FI12 and FI22, and the writing duration of the third field durations FI13 and FI23.

A shift register SR to which the start pulse signal GST is first applied is different between the first scanning circuit 9A illustrated in FIG. 8 and the second scanning circuit 9B illustrated in FIG. 9. Accordingly, a scanning direction SCAN1 of the sequential circuit SC of the second scanning circuit 9B is opposite to a scanning direction SCAN2 of the sequential circuit SC of the first scanning circuit 9A.

For example, the timing controller 13 provides the low-level SWR to the control wire WR in the writing duration of the first field durations FI11 and FI21, the writing duration of the second field durations FI12 and FI22, and the writing duration of the third field durations FI13 and FI23. As illustrated in FIG. 8, the first scanning circuit 9A sequentially outputs high-level gate signals VG1, VG2, VG3, . . . , VGi, VGi+1, and VGi+2 to the rows of the scanning lines GL in the scanning direction SCAN1. As illustrated in FIG. 9, the second scanning circuit 9B sequentially outputs high-level gate signals VGi+2, VGi+1, VGi, . . . , VG3, VG2, and VG1 to the rows of the scanning lines GL in the scanning direction SCAN2 opposite to the scanning direction SCANT. Hereinafter, the gate signals VG1, VG2, VG3, . . . , VGi, VGi+1, and VGi+2 are collectively referred to as the gate signals VG in some cases.

An amplification circuit of each of the first scanning circuit 9A and the second scanning circuit 9B converts the gate signals VG into the second potential V2 and provides the second potential V2 in pulses to a scanning line GL in the writing duration of the first field durations FI11 and FI2*l*, the writing duration of the second field durations FI12 and FI22, and the writing duration of the third field durations FI13 and FI23. The second potential V2 opens the source-drain of the switching element 1.

The scanning line GL is maintained at the third potential V3 in the holding duration of the first field durations FI11 and FI21, the holding duration of the second field durations FI12 and FI22, and the holding duration of the third field durations FI13 and FI23. The third potential V3 closes the source-drain of the switching element 1.

The following describes operation of the first scanning circuit 9A and the second scanning circuit 9B in the writing duration of the fourth field duration FI14 or the writing duration of the fourth field duration FI24.

In the writing duration of the fourth field duration FI14 or the writing duration of the fourth field duration FI24, the high-level input signal SWR is provided from the control wire WR to the second input terminal TI2 of a logic circuit OC, and the high-level gate signal VG is output from the output terminal TO to the scanning line G.

The amplification circuit of each of the first scanning circuit 9A and the second scanning circuit 9B converts the gate signals VG into the first potential V1 and provides the first potential V1 in pulses to a scanning line GL in the writing duration of the fourth field durations FI14 and FI24.

The scanning line GL is maintained at the third potential V3 in the holding duration of the fourth field duration FI14 or the holding duration of the fourth field duration FI24. The third potential V3 is provided to the scanning line GL after the first potential V1 is provided in a predetermined time (frame time). After the third potential V3 is provided, the fourth potential V4 is provided to the scanning line GL. The fourth potential V4 closes the source-drain of the switching element 1 and is lower than the third potential V3. Potential control is easier and more reliable through the third potential V3 before transition to the fourth potential V4. After providing the third potential V3 to the scanning line GL, the first scanning circuit 9A and the second scanning circuit 9B do not necessarily need to provide the fourth potential V4 to the scanning line GL before the inversion drive timing. As illustrated in FIG. 7, the timing at which the fourth potential V4 is provided to the scanning line GL may be simultaneous with the inversion drive timing.

The duration in which the light source device L, which illuminates the display panel P, is turned on is a duration (holding duration) in which the potential of one of the two electrodes is held and that is set after the writing duration in which the source-drain of the switching element 1 is opened by the second potential V2. Accordingly, the duration in which the potential of the pixel Pix is held and contents of display output are stabilized corresponds to the duration in which the display panel P is illuminated.

The light source device L includes light sources (for example, the first light source 11R, the second light source 11G, and the third light source 11B) of a plurality of colors, and the number of writing durations and potential holding durations in a predetermined time (frame time) is equal to or larger than the number of colors of the light source. The number of writing durations and potential holding durations in the predetermined time (frame time) is equal to the number of colors of the light source plus one. The writing durations and the potential holding durations in the predetermined time each include a first duration (the first field duration FI11 or the first field duration FI21) corresponding to the first light source 11R, a second duration (the second field duration FI12 or the second field duration FI22) corresponding to the second light source 11G, and a third duration (the third field duration FI13 or the third field duration FI23) corresponding to the third light source 11B. Thus, output corresponding to the RGB gradation value is displayed at each pixel Pix.

When the number of scanning lines GL increases, the signal quality of a drive signal pulse that drives each scanning line GL is potentially affected due to time-constant difference. To avoid the influence, the display device 100 includes the first scanning circuit 9A and the second scanning circuit 9B.

The background of the back surface is seen through when the display device 100 is viewed from the display surface side, and the background of the display surface is seen through when the display device 100 is viewed from the back surface side. Thus, it is required to reduce the number of circuits disposed in the first peripheral region PA1, the second peripheral region PA2, and the fourth peripheral region PA4 so that the background of the back surface is seen through when viewed from the display surface side and the background of the display surface is seen through when viewed from the back surface side in the first peripheral region PA1, the second peripheral region PA2, and the third peripheral region PA3, as well. Thus, the first scanning circuit 9A and the second scanning circuit 9B are disposed in the third peripheral region PA3 together with the driver IC 5.

Accordingly, the lengths of the first extension wires DW1 and the second extension wires DW2 increase. Signal delay occurs as the lengths of the first extension wires DW1 and the second extension wires DW2 increase.

The following describes, as a comparative example, a display device in which each scanning line GL has no broken part SP of the present embodiment and the first scanning circuit 9A and the second scanning circuit 9B are coupled to each other through the scanning line GL. In the comparative example, no broken part SP illustrated in FIG. 1 is provided. In the comparative example, when the first scanning circuit 9A and the second scanning circuit 9B send drive signal pulses to the scanning line GL in the same scanning direction SCAN1, the timing of the drive signal pulse from the first scanning circuit 9A and the timing of the drive signal pulse from the second scanning circuit 9B are shifted from each other and short circuit potentially occurs.

In a first method of preventing the short circuit in the comparative example, output pins of the second scanning circuit 9B are disposed opposite output pins of the first scanning circuit 9A. However, the second extension wires DW2 need to three-dimensionally intersect to match the relation between each output pin number of the first scanning circuit 9A and the corresponding first extension wire DW1 and the relation between each output pin number of the second scanning circuit 9B and the corresponding second extension wire DW2. Three-dimensional intersections lead to increase in the frequency of the occurrences of electrostatic discharge failure and thus are not preferable.

In a second method of preventing the short circuit in the comparative example, the scanning direction SCAN1 of the sequential circuit SC of the second scanning circuit 9B is set to be opposite to the scanning direction SCAN2 of the sequential circuit SC of the first scanning circuit 9A.

With this configuration, the output pins of the second scanning circuit 9B point in the same direction as the output pins of the first scanning circuit 9A, and thus the above-described three-dimensional intersection is unnecessary. With the second method, the short circuit can be prevented only in some durations. For example, the timing of the drive signal pulse from the first scanning circuit 9A and the timing of the drive signal pulse from the second scanning circuit 9B match each other in the writing duration of the first field durations FI11 and FI2*l*, the writing duration of the second field durations FI12 and FI22, and the writing duration of the third field durations FI13 and FI23. However, in the comparative example, although the scanning directions of the sequential circuit SC of the first scanning circuit 9A and the second scanning circuit 9B are opposite to each other, the timing of the drive signal pulse from the first scanning circuit 9A and the timing of the drive signal pulse from the second scanning circuit 9B are shifted from each other and the short circuit potentially occurs in the writing duration of the fourth field duration FI14 or the writing duration of the fourth field duration FI24.

This is because the first potential V1 is provided to the scanning lines GL all at once in the writing duration of the fourth field duration FI14 or the writing duration of the fourth field duration FI24. The high-level input signal SWR is provided from the control wire WR to the second input terminals TI2, and all logic circuits OC output the high-level gate signals VG from the output terminals TO to the scanning lines G. The logic circuits OC operate in the order of transfer of the high-level input signal SWR to the control wire WR, and thus an extremely short time difference in operation occurs between the logic circuits OC. For example, as illustrated in FIG. 8, the operation order of the logic circuits OC in the first scanning circuit 9A is an order as if the operation order aligns with a scanning direction ASCAN1. As illustrated in FIG. 9, the operation order of the logic circuits OC in the second scanning circuit 9B is an order as if the operation order aligns with a scanning direction ASCAN2. As illustrated in FIG. 1, the scanning direction ASCAN1 of the first scanning circuit 9A and the scanning direction ASCAN2 of the second scanning circuit 9B are the same direction. The first extension wires DW1 are disposed line symmetric to the second extension wires DW2 with respect to the center line passing in the second direction Y through the center of the display region 7 in the first direction X. As a result, when the scanning direction ASCAN1 and the scanning direction ASCAN2 are the same direction, the first extension wires DW1 are selected in descending order of length and drive signal pulses are sent to the first scanning circuit 9A whereas the second extension wires DW2 are selected in ascending order of length and drive signal pulses are sent to the second scanning circuit 9B. Accordingly, the transfer speed of the drive signal pulses differs due to the time constant difference between each first extension wire DW1 and the corresponding second extension wire DW2, and the operation difference between the logic circuits OC increases along with transfer through the first extension wires DW1 and the second extension wires DW2. In the comparative example, since no broken part SP is provided, the timing of the drive signal pulse transmitted from the first scanning circuit 9A to each first extension wire DW1 and the timing of the drive signal pulse transmitted from the second scanning circuit 9B to the corresponding second extension wire DW2 are shifted from each other and short circuit potentially occurs.

However, in the display device 100 of the present embodiment, the scanning lines GL are each provided with the broken parts SP and divided. No short circuit occurs between the first scanning circuit and the second scanning circuit even when the timing of the drive signal pulse transmitted from the first scanning circuit 9A to each first extension wire DW1 and the timing of the drive signal pulse transmitted from the second scanning circuit 9B to the corresponding second extension wire DW2 are shifted from each other. Moreover, three-dimensional intersection of the second extension wires DW is unnecessary, and the frequency of the occurrences of electrostatic discharge failure decreases as compared to the comparative example.

The first scanning circuit 9A and the second scanning circuit 9B apply the drive signal pulses to the scanning lines GL in accordance with outputs from the shift registers SR and the control wire WR. Accordingly, the first scanning circuit 9A and the second scanning circuit 9B sequentially apply the drive signal pulses to the rows of scanning lines GL in the writing duration of the first field durations FI11 and FI2*l*, the writing duration of the second field durations FI12 and FI22, and the writing duration of the third field durations FI13 and FI23. Thus, it is possible to prevent signal delay of the drive signal pulses.

The first potential V1 is provided to the scanning lines GL all at once in the writing duration of the fourth field duration FI14 or the writing duration of the fourth field duration FI24 according to the present embodiment. Thus, a potential control duration (for example, the fourth field duration FI14 or the fourth field duration FI24) for preventing display output failure is further reduced.

The operational sequence of the shift registers SR of the first scanning circuit 9A is opposite to the operational sequence of the shift register SR of the second scanning circuit 9B. Accordingly, scanning is performed in the same direction in the left region 7A and the right region 7B of the display region 7 illustrated in FIG. 4, and thus it is possible to directly process RGB image data in one frame duration, and for example, it is possible to reduce the amount of memory used to store image data.

The timing controller 13 as a control circuit simultaneously processes outputting of the high-level input signal SWR to one control wire WR in the first scanning circuit 9A and the other control wire WR in the second scanning circuit 9B. As a result, the first potential V1 is provided to all scanning lines GL in the writing duration of the fourth field duration FI14 or the writing duration of the fourth field duration FI24.

The first scanning circuit 9A is disposed in the third peripheral region PA3 at a position different from the first peripheral region PA1. The first scanning circuit 9A is coupled to the first coupling end parts CE1 through the corresponding first extension wires DW1. The second scanning circuit 9B is disposed in the third peripheral region PA3 at a position different from the second peripheral region PA2. The second scanning circuit 9B is coupled to the second coupling end parts CE2 through the corresponding second extension wires DW2. Accordingly, the first extension wires DW1 are disposed in the first peripheral region PA1, and the second extension wires DW2 are disposed in the second peripheral region PA2. Since the first scanning circuit 9A and the second scanning circuit 9B are not disposed in the first peripheral region PA1 and the second peripheral region PA2, the first peripheral region PA1 and the second peripheral region PA2 are see-through regions and unlikely to be distinguished from the display region 7, and accordingly, the display region 7 can be recognized to be large by an observer.

It should be understood that, among other effects achieved by aspects described in the present embodiment, those clear from the present specification description or those that could be thought of by the skilled person in the art as appropriate are achieved by the present disclosure.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure. At least one of omission, replacement, and change of any constituent component may be performed in various manners without departing from the scope of the above-described embodiments and modifications.

In the present embodiment, as illustrated in FIG. 3, in the present embodiment, each pixel electrode 2 faces the common electrode 6 with the liquid crystal layer 3 interposed therebetween. The display panel P may have a horizontal electric field control configuration in which the pixel electrodes 2 and the common electrode 6 are provided in one substrate and the orientation of the liquid crystal layer 3 is controlled by an electric field generated by each pixel electrode 2 and the common electrode 6. The liquid crystal layer 3 may be a liquid crystal other than the polymer-dispersed liquid crystal. The light source device L may be a backlight when the display panel is not used as the above-described transmissive liquid crystal display panel.

The combination of light sources of a plurality of colors included in the light source device L is not limited to the combination of red (R), green (G), and blue (B). For example, the light source device L may include light sources corresponding to the three colors of cyan, magenta, and yellow in a combination.

Specific numerical values including the first potential V1, the second potential V2, the third potential V3, and the fourth potential V4, and any other potential exemplarily described above are merely exemplary and the present disclosure is not limited thereto, but the numerical values may be changed as appropriate as long as the relative relation of positive and negative values or two corresponding values is maintained.

In the present embodiment, as illustrated in FIG. 5, inversion drive is performed for each frame duration so that the potential of a pixel electrode 2 is relatively higher than the potential of the common electrode 6 in the duration FL1 of the first frame and the potential of the pixel electrode 2 is relatively lower than the potential of the common electrode 6 in the duration FL2 of the second frame. This is merely specific exemplary control of an inversion drive method and the present disclosure is not limited thereto. For example, the relative potential magnitudes of the pixel electrode 2 and the common electrode 6 may be inverted for each set of a plurality of frame durations.

What is claimed is:

1. A display device comprising:

a plurality of scanning lines extending in a first direction;

a plurality of signal lines extending in a direction intersecting the first direction;

a first scanning circuit coupled to first coupling end parts of the scanning lines;

a second scanning circuit coupled to second coupling end parts of the scanning lines, the second coupling end parts being opposite the first coupling end parts of the scanning lines, the first coupling end parts coupled to the first scanning circuit;

a signal output circuit configured to supply image signals to the signal lines, a plurality of pixels surrounded by the scanning lines and the signal lines;

pixel electrodes provided at the respective pixels;

a common electrode; and a controller configured to control potential of the pixel electrodes and the common electrode, wherein the scanning lines each have a broken part, the common electrode is switched between high potential and low potential at an inversion drive timing in each predetermined time, the pixel electrodes and the common electrode are equipotential right before the inversion drive timing, and first potential of a drive signal provided to the scanning lines in a duration in which a signal for setting the pixel electrodes and the common electrode to be equipotential is provided to the signal lines is higher than potential in the other duration.

2. The display device according to claim 1, wherein the first scanning circuit and the second scanning circuit each include a sequential circuit, a control wire, and a plurality of logic circuits, the sequential circuit includes a plurality of shift registers, the logic circuits are coupled to the shift registers in one-to-one relation, the control wire of the first scanning circuit is coupled to all of the logic circuits of the first scanning circuit, the control wire of the second scanning circuit is coupled to all of the logic circuits of the second scanning circuit, and the first scanning circuit and the second scanning circuit each apply drive signal pulses to the scanning lines in accordance with outputs from the shift registers and the control wire.

3. The display device according to claim 2, wherein the operational sequence of the shift registers of the first scanning circuit is opposite to the operational sequence of the shift registers of the second scanning circuit.

4. The display device according to claim 2, further comprising a control circuit configured to simultaneously process outputs to the control wire of the first scanning circuit and the control wire of the second scanning circuit.

5. The display device according to claim 1, further comprising:

a plurality of first extension wires disposed in a first peripheral region provided outside the first coupling end parts in the first direction; and a plurality of second extension wires disposed in a second peripheral region provided outside the second coupling end parts in the first direction and opposite the first peripheral region with respect to a display region in which the pixels surrounded by the scanning lines and the signal lines are disposed, wherein the first scanning circuit disposed at a position different from the first peripheral region and the second peripheral region is coupled to the first coupling end parts through the corresponding first extension wires, and the second scanning circuit disposed at a position different from the first peripheral region and the second peripheral region is coupled to the second coupling end parts through the corresponding second extension wires.

6. The display device according to claim 5, wherein the first extension wires are disposed line symmetric to the second extension wires.

* * * * *